Sept. 22, 1953

R. U. DUNN 2,652,846

CONTROL APPARATUS

Filed July 22, 1946

INVENTOR.
R.U.DUNN

BY Hudson & Young

ATTORNEYS

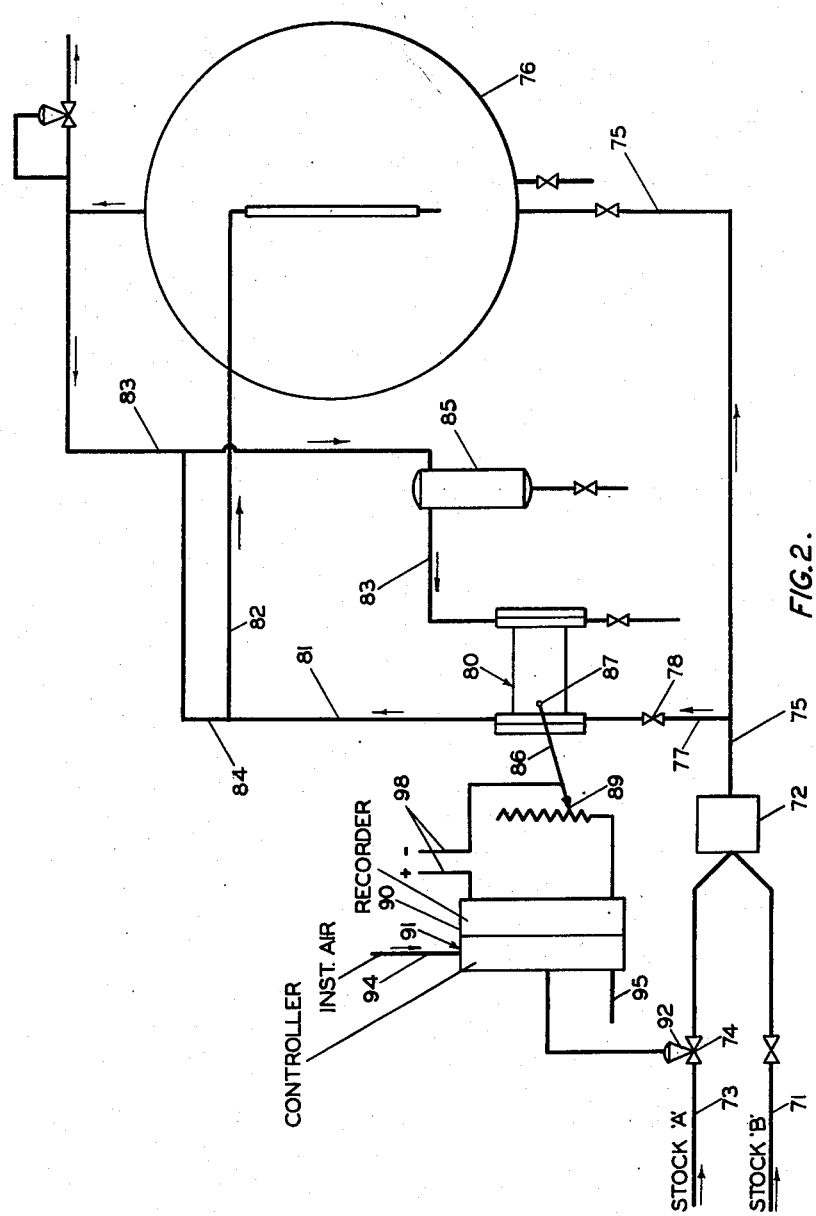

Patented Sept. 22, 1953

2,652,846

UNITED STATES PATENT OFFICE 2,652,846

CONTROL APPARATUS

Robert U. Dunn, Phillips, Tex., assignor to Phillips Petroleum Company, a corporation of Delaware Application July 22, 1946, Serial No. 685,390

4 Claims. (Cl. 137—91)

This invention relates to process control based upon the specific gravity of a liquid in process.

Heretofore, instruments for the intermittent or continuous determination of specific gravity of liquids in process have been relatively intricate and correspondingly expensive. I have devised a process control system based upon specific gravity measurements made by the adaptation of an aneroid type manometer to the determination of specific gravity of a liquid wherein a column of liquid of constant head is balanced against the bellows of the manometer and the movement of the bellows controls the operation of a process.

One object of my invention is to devise an apparatus adapted to control a process, the operation of the apparatus being based upon the specific gravity of a liquid at a process point.

Still another object of my invention is to devise a relatively inexpensive apparatus and one simple to operate for liquid process control based upon differences in specific gravity of liquids in process.

Still other objects and advantages of my invention will be apparent to those skilled in the art from a careful study of the following description and attached drawing which respectively describes and illustrates diagrammatically forms of apparatus in which the method of my invention may be practiced.

In the drawing,

Figure 2 illustrates an application of the specific gravity determining and recording assembly of Figure 1 wherein a process is controlled according to specific gravity of a product of the process.

Figure 1:
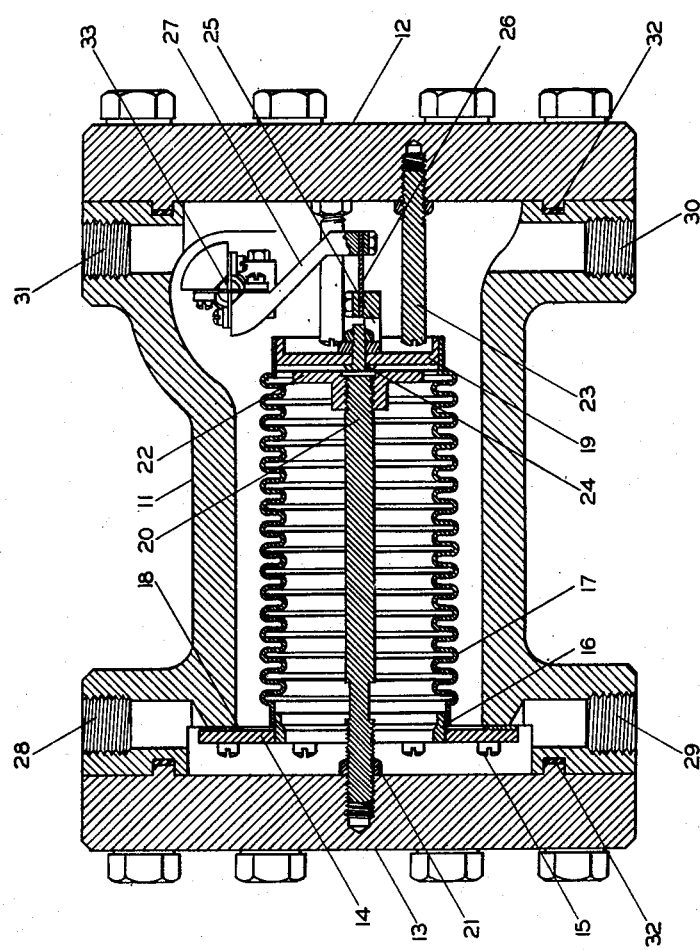
Figure 1 shows in section and diagrammatically an aneroid manometer.

The specific gravity of a liquid or solid may be defined as the ratio of weights of equal volumes of the liquid or solid in question and water at the same or different temperatures. The weight of a unit volume of liquid or solid is referred to as the density of that liquid or solid and accordingly the specific gravity of a liquid may then be considered the ratio of the density of the liquid or solid to the density of water.

In the following description, the apparatus utilized in accordance with my invention is intended to "weigh" a given volume of a liquid and to indicate or to record the determined weight in terms of "specific gravity." This procedure may be considered sufficiently accurate for process control purposes since in fact, specific gravity is proportional to density or to the weight per unit volume.

The weight of the herein disclosed column of liquid may be considered in terms of pounds per square inch, or grams per square centimeter, or other units and observed and/or recorded in terms of density or specific gravity.

Referring to the drawing and specifically to Figure 1, the aneroid manometer herein described for exemplary purposes, consists of a housing 11, the ends of which are closed by plates 12 and 13, plate 12 covering the liquid containing end and plate 13 covering the gas or vapor containing end of the manometer. In the gas end of the instrument may be an annular plate 14, the outer portion of the plate being fastened by bolts 15 to the body or housing 11 as shown. In the central opening of this plate is a collar member 16 which serves at least in part as a support for the fixed end of the bellows 17. This bellows 17 has a flange member 18 which is adapted to be inserted between the plate 14 and the housing 11 and contains bolt holes positioned to match those in plate 14.

The movable end of the bellows 17 is fixed in a gas tight manner to end plate 19. A threaded pin 20 is inserted in the center of the end plate 13, as shown, and carries a lock nut 21 so that the pin 20 may be screwed into the end plate to a predetermined depth, then locked in position. The opposite end of the pin 20 is also threaded and adapted to carry a stop plate 22 as shown. Several stop pins 23 are arranged around a circle and fastened to the end plate 12 as shown. These stop pins 23 are intended to prevent the bellows 17 from expanding beyond its elastic limit while the stop plate 22 is intended to prevent over compression of the bellows. The positions of these pins and plate are so adjusted that the end plate 19 of the bellows can move an appreciable distance and yet prevent over movement and permanent deformation of the bellows.

To the outside and center of the plate 19 is fixed a threaded pin 24 upon which is fastened a flexible pin holder 25. To this holder is attached a flexible pin 26 for transmitting movement from the bellows to the arm 27.

The vapor or gas end of this aneroid assembly has a threaded inlet 28 and a threaded outlet 29, which latter may be used for gas outlet purposes or for drainage of condensate in case some vapors condense. The liquid end is provided with a similar threaded inlet 30 and threaded outlet 31.

The end plates may be sealed in a gas or liquid tight manner to the housing proper by gasket means 32, the plates being firmly bolted in place.

The bellows expands with movement of the end plate 19 toward the stop pins 23 when fluid pressure on the gas end and within the bellows is greater than the pressure outside the bellows. Likewise, the bellows contracts with movement of its free end away from the stop pins 23 and toward the stop plate 22 when pressure conditions are reversed.

Movement of the arm 27 imparts a rotary motion to the shaft 33. This latter extends through the housing 11, a torsional tube preventing fluid leakage. The outer end of the shaft 33 is attached to a recording and/or control mechanism as hereinafter set forth.

Figure 2 represents an embodiment of my invention utilizing the apparatus of Figure 1 in a process control system. My invention may be used in conjunction with many processes for their control providing liquid material in process is subject to change in specific gravity. As an illustration of such an application, I will describe a blending operation.

It is frequently necessary in petroleum refinery operations to blend two liquid stocks to make a third having predetermined properties. For example, it may be required to mix two gasoline stocks, which I will identify as stock A and stock B, to make a blend having certain properties. Stock A may have an A. P. I. gravity of say 55 while stock B may have a gravity of 65. A 50-50 mixture, by volume will have an A. P. I. gravity very nearly 60. This A. P. I. value corresponds to a specific gravity of 0.7389.

In Figure 2, the stock B may be pumped through a pipe 71 into a mixing device 72. Stock A passes through a line 73 and a motor valve 74 into the mixing device 72. From the mixer the blend passes by way of a transfer line 75 into a storage tank 76. From line 75 a small volume of liquid passes through pipe 77 and valve 78 into the liquid end of an aneroid manometer assembly 30, as hereinbefore explained. The blended liquid passes on through the manometer into a 50-inch long tube 81. From this tube 81 liquid passes through an overflow pipe 82, which is 50 inches above the center of the manometer, into the tank 76. A gas or vapor line 83 leads from the top of the tank the gas side of the manometer with a branch line 84 connecting with the upper end of tube 81. The line 83 contains a drip pot 85 for separation of condensate which might form in line 83. The net weight of the 50 inch column of liquid causes a movement of a lower arm 86 which movement is in response to rotation of a shaft 87 similar to shaft 33 of Figure 1. Arm 86 may cause a variable current to flow through wires 88 by operation of a rheostat 89. This variable current may then be translated by such an instrument as a Micromax recorder 90, as manufactured by Leeds and Northrup Company of Philadelphia, or by any other suitable instrument, into a pen arm movement for making a continuous record on a suitable chart. This recorder is preferably a controller-recorder instrument 91 and such an instrument is manufactured by said company, and other instrument manufacturers. The controller portion of this combined instrument may operate electrically or by compressed air to open or to close a motor valve 92 which controls the flow of stock A into the mixing device 72. In this figure I have illustrated an air operated motor valve, air pressure being communicated from the controller 91 through an air pressure line 93 to the diaphragm portion of the motor valve 92. Constant pressure air for this operation comes from a source, not shown, through an instrument air line 94 to the controller, and exhaust air therefrom passes through tube 95 to the atmosphere.

In the operation of the apparatus of Figure 2, the blended liquid in tank 76 is exceptionally close to the desired A. P. I. gravity of 60, that is plus or minus 1° A. P. I. when blending a stock of 65° A. P. I. gravity with a stock of 55° A. P. I. gravity on a 50-50 volume basis.

The chart in the recorder portion of the recorder-controller instrument may be graduated in terms of degrees A. P. I. gravity or in terms of specific gravity, or in any other units as desired.

The motor valve 92 may preferably be of a spring loaded type so that at a given air pressure on its diaphragm the valve will be open to desired extent and when the air pressure increases or decreases on the diaphragm the valve will open or close in proportion to the change of pressure.

In the calibration of such an instrument or assembly, at least two points on the chart should be determined. If desired, water may be used in the 50 inch column, and the specific gravity of 1 noted when the pointer or pen arm of the recorder comes to rest. If n-pentane is used for a second point, the value of approximately 0.634 at 60° F. may be assigned to its point on the chart. If A. P. I. degrees are the units to be used, the water point may be marked 10 and the pentane point 91.7, since these values are the respective A. P. I. gravities of these liquids at 60° F. Points between these two extremes may be marked also, especially points of 55° to 65° when mixing stocks of these gravities. During calibration with any liquid a pressure equivalent to the intended operating pressure should be maintained on columns 50 and 58 with a hydrocarbon vapor representative of that to be encountered in operation.

While I have described my invention in relation to the blending of two liquids of different specific gravities, it may be used advantageously in other applications. For example, in the pumping of petroleum products through pipe lines, a problem exists at the outlet end of the pipeline as to when a gasoline which follows a kerosene is of sufficient purity to run into a gasoline storage tank. Kerosenes have A. P. I. gravities of from about 42° to 46° while gasolines have gravities of about 60° to 65°. A pumping of kerosene at a pipe line terminal will of course be run into a kerosene storage tank, but before turning into its storage the kerosene must be free of gasoline, and vice versa. Thus my control apparatus may be set up to determine the gravity of the liquid arriving by pipeline at a terminal, and as long as the gravity is that of gasoline, this product will be diverted to a gasoline storage tank. When the kerosene starts to come as evidenced by a decrease in A. P. I. gravity, the pipeline can be closed off to the gasoline tank and another valve opened to permit flow of "mixture" of gasoline and kerosene to a "slop" tank, then when the pipe line effluent is pure kerosene, the slop tank valve may be closed and a valve to a kerosene storage tank opened. By the use of such an assembly the amount of "slop" accumulating and requiring distillation for separation into its component parts is kept at a minimum. By such automatic and controlled operation labor costs are kept at a low level.

Many other applications of my invention to process control may be made by those skilled in such art.

Having disclosed my invention, I claim:

1. In a system for blending two component liquids for the production of a blend having a predetermined specific gravity wherein a first liquid and a second liquid in their respective transfer pipes are joined in a mixing device and therein mixed to produce a blend having said predetermined specific gravity, and wherein the rate of flow of one component is regulated in relation to the flow of the other component to produce said blend and in response to the specific gravity of the blend, the combination comprising means to withdraw a quantity of the blended liquids, and means to determine the weight of a column of predetermined height of said withdrawn liquid, said latter means comprising a pipe vertically disposed, means for passing said withdrawn liquid through said column of predetermined height, an expansible bellows in fluid communication with the bottom end of said vertically disposed pipe and said bellows being adapted to expand or to contract in response to the weight of liquid in said vertically disposed pipe, and means responsive to the expansion or contraction of said bellows to control the rate of flow of one of said component liquids relative to the flow of the other of said component liquids.

2. In a system for blending two component liquids for the production of a blend having a predetermined specific gravity wherein a first liquid and a second liquid are fed to a mixing device and therein mixed to produce said blend, and wherein the rate of flow of one of said liquids is regulated to produce said predetermined specific gravity, the combination comprising means to withdraw a quantity of said blend, and means to determine the weight of a column of predetermined height of the withdrawn liquid, said latter means comprising a pipe disposed in vertical position, means for passing said withdrawn liquid through said vertically disposed pipe, an expansible member having one side thereof in fluid communication with the bottom end of said pipe, a conduit communicating with the other side of said expansible member and with an enclosed region above the liquid level of the mixed blend therein whereby said member expands or contracts in accordance with the weight of liquid in said pipe independently of variations in vapor pressure of said mixed blend, and means responsive to the expansion or contraction of said expansible member to control the rate of flow of one of said liquids relative to the rate of flow of the other of said liquids.

3. In a system for regulating the flow of a first liquid in a first pipe in relation to the flow of a second liquid in a second pipe in response to the weight of a unit of volume of a third liquid in a third pipe, wherein said third pipe is connected to said first and second pipes such that the flow of said liquid in said third pipe includes the sum of the flow of liquids in said first and second pipes, in combination; means to withdraw a quantity of said third liquid from said third pipe; means to determine the weight of a column of said third liquid comprising a vertically disposed pipe of predetermined height through which said withdrawn third liquid is passed, and expansible means directly in fluid communication with the bottom end of said vertically disposed pipe; and means responsive to said weight measuring expansible means to control the rate of flow of said first liquid in said first pipe.

4. In a system for regulating the flow of a first liquid in a first pipe in relation to the flow of a second liquid in a second pipe in response to the weight of a unit of volume of a third liquid in a third pipe, wherein said third pipe is connected to said first and second pipes such that the flow of said liquid in said third pipe includes the sum of the flow of liquids in said first and second pipes, in combination; means to withdraw a quantity of said third liquid from said third pipe; means to determine the weight of a column of said third liquid comprising a vertically disposed pipe of predetermined height through which said withdrawn third liquid is passed, and expansible means directly in fluid communication with the bottom end of said vertically disposed pipe, said expansible means adapted to expand or contract in response to the weight of said column of third liquid in said vertically disposed pipe; and electropneumatic means responsive to the expansion or contraction of said expansible means to control the rate of flow of said first liquid in said first pipe.

ROBERT U. DUNN.

References Cited in the file of this patent

UNITED STATES PATENTS

| Number | Name | Date |
|---|---|---|
| 1,340,399 | Ohlson | May 18, 1920 |
| 1,402,926 | Frankenberg | Jan. 10, 1922 |
| 1,888,577 | Stephens | Nov. 22, 1932 |
| 1,925,833 | French | Sept. 5, 1933 |
| 1,932,228 | Postel | Oct. 24, 1933 |
| 2,200,261 | Carney | May 14, 1940 |
| 2,231,781 | Swerdloff | Feb. 11, 1941 |
| 2,294,501 | Junkins | Sept. 1, 1942 |
| 2,325,573 | Thompson | July 27, 1943 |
| 2,338,825 | Stoner | Jan. 11, 1944 |
| 2,445,255 | Younkin | July 13, 1948 |